United States Patent [19]

Yu et al.

[11] Patent Number: 4,488,231
[45] Date of Patent: Dec. 11, 1984

[54] COMMUNICATION MULTIPLEXER HAVING DUAL MICROPROCESSORS

[75] Inventors: Kin C. Yu, Burlington; Gary J. Goss, Acton, both of Mass.

[73] Assignee: Honeywell Information Systems Inc., Waltham, Mass.

[21] Appl. No.: 512,701

[22] Filed: Jul. 11, 1983

Related U.S. Application Data

[63] Continuation of Ser. No. 192,126, Sep. 29, 1980, abandoned.

[51] Int. Cl.³ .............................................. G06F 13/00
[52] U.S. Cl. ................................................... 364/200
[58] Field of Search ............................... 364/200, 900

[56] References Cited

U.S. PATENT DOCUMENTS

| | | | |
|---|---|---|---|
| 3,500,466 | 3/1970 | Carleton | 364/200 |
| 4,016,548 | 4/1977 | Law | 364/200 |
| 4,032,899 | 6/1977 | Jenny | 364/200 |
| 4,074,352 | 2/1978 | Cook | 364/200 |
| 4,075,691 | 2/1978 | Davis et al. | 364/200 |
| 4,133,030 | 1/1979 | Huettner et al. | 364/200 |
| 4,200,930 | 4/1980 | Rawlings | 364/200 |
| 4,215,400 | 7/1980 | Denko | 364/200 |
| 4,231,086 | 10/1980 | Tarbox et al. | 364/200 |

*Primary Examiner*—James D. Thomas
*Assistant Examiner*—David Y. Eng
*Attorney, Agent, or Firm*—George Grayson; Nicholas Prasinos

[57] ABSTRACT

A data processing system includes a communication subsystem having an I/O microprocessor for communicating with a central processing unit and a main memory; and a line microprocessor for communicating with a number of devices. The I/O microprocessor and the line microprocessor communicate with each other through mailboxes stored in a shared memory. The line microprocessor interrupts the I/O microprocessor to process data bytes being transferred between main memory and a device requesting service when the line microprocessor has responded to the requesting device and loaded the mailbox.

10 Claims, 16 Drawing Figures

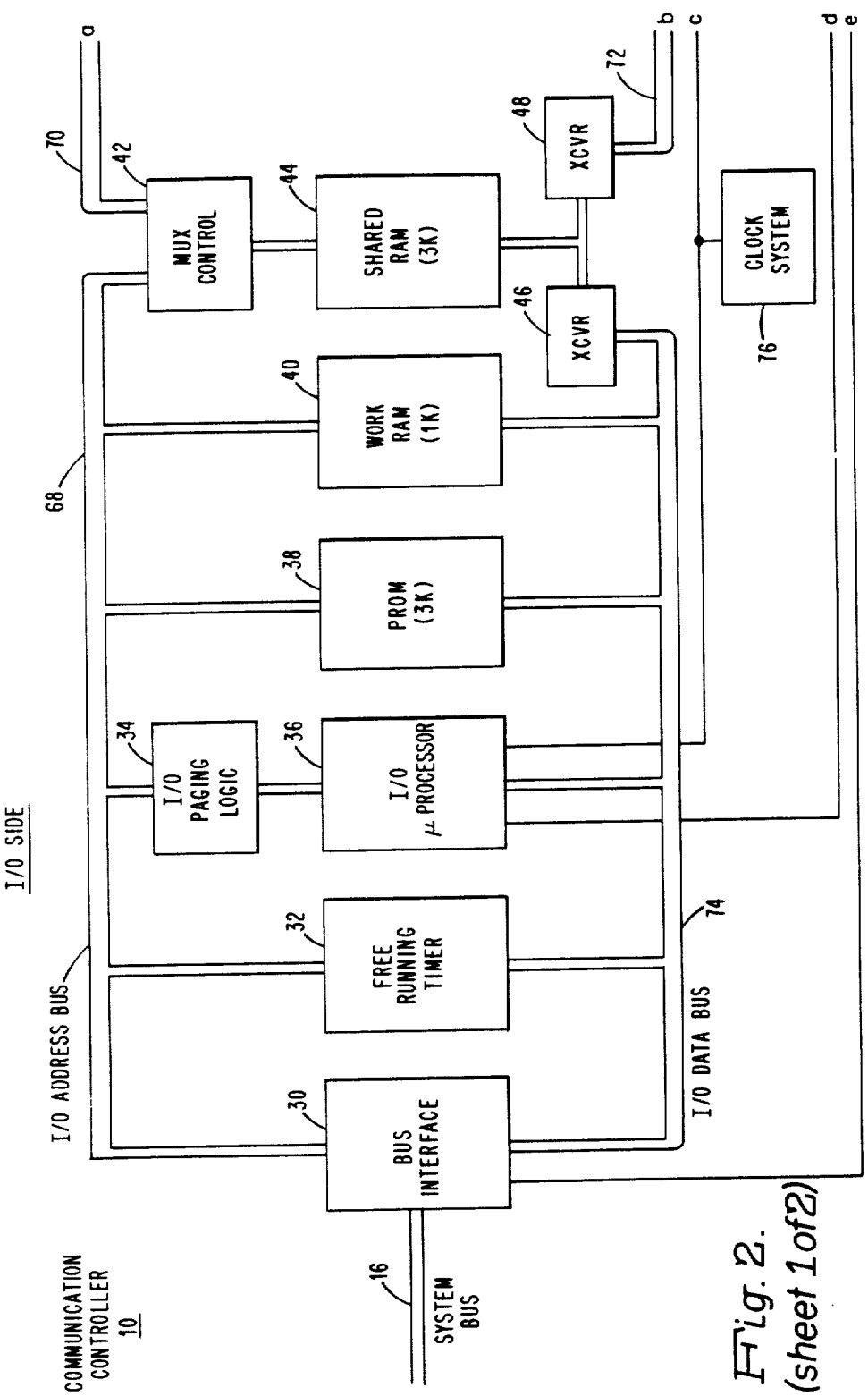
Fig. 2. (sheet 1 of 2)

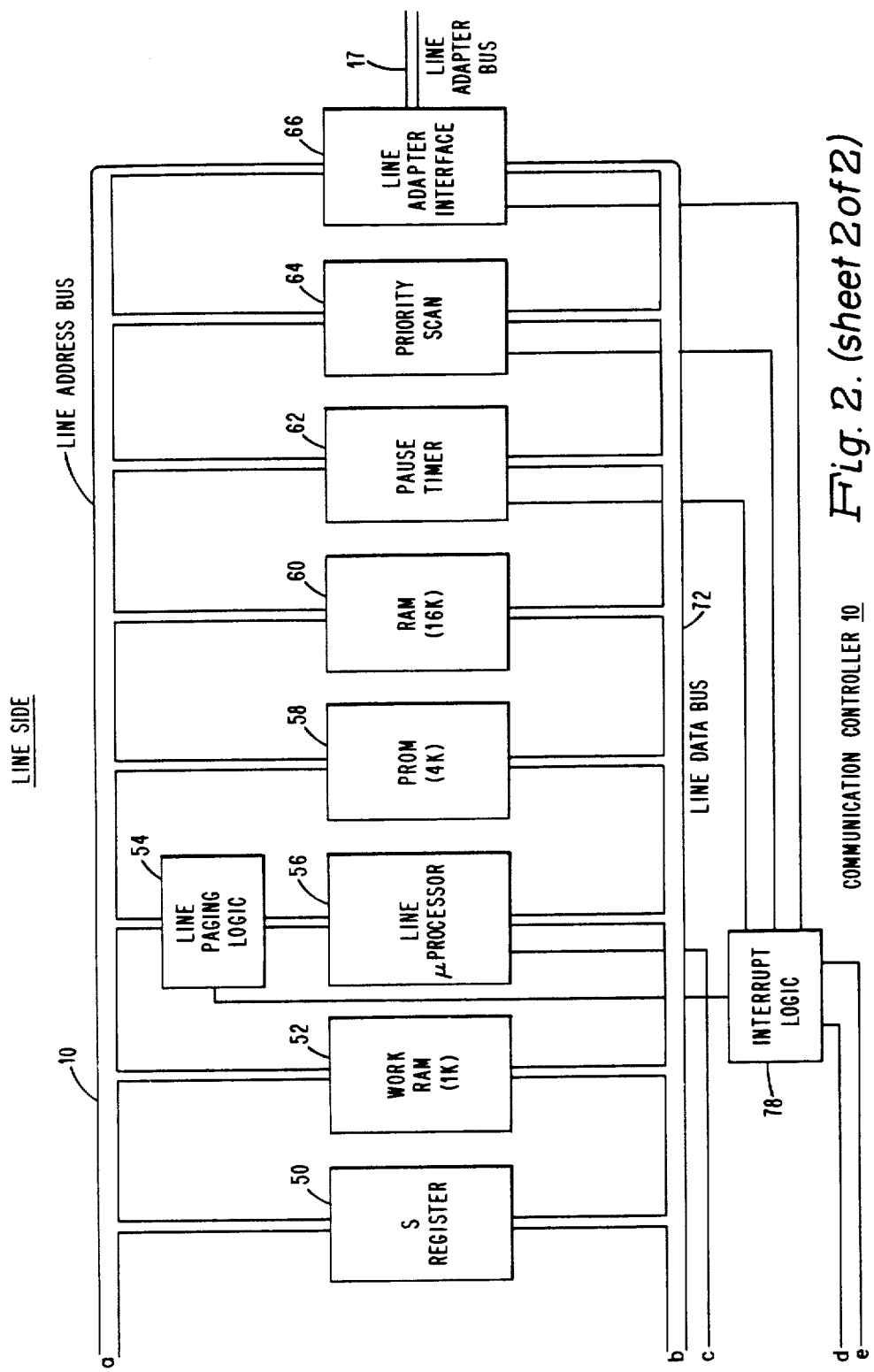
Fig. 2. (sheet 2 of 2)

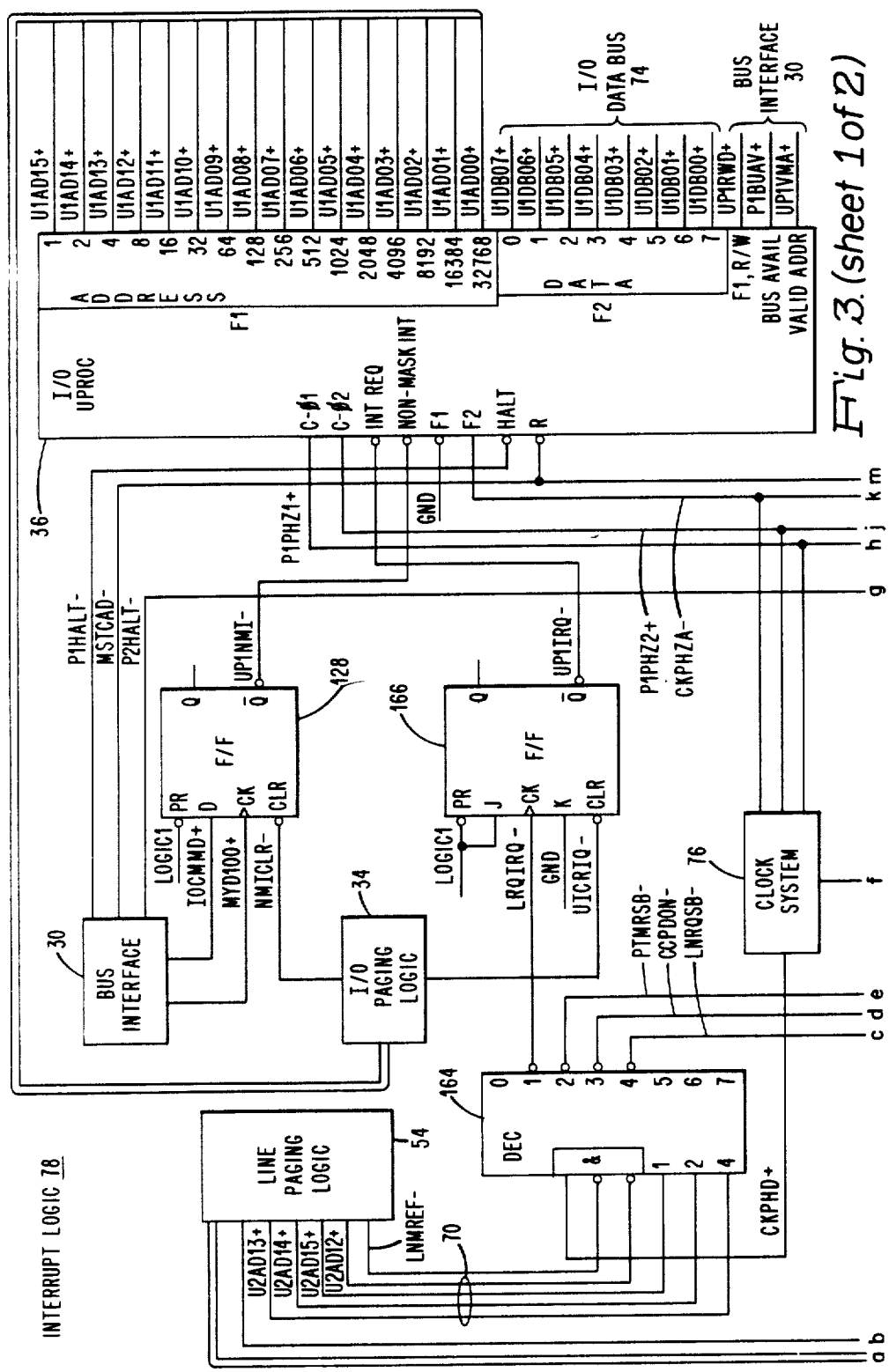
Fig. 3. (sheet 1 of 2)

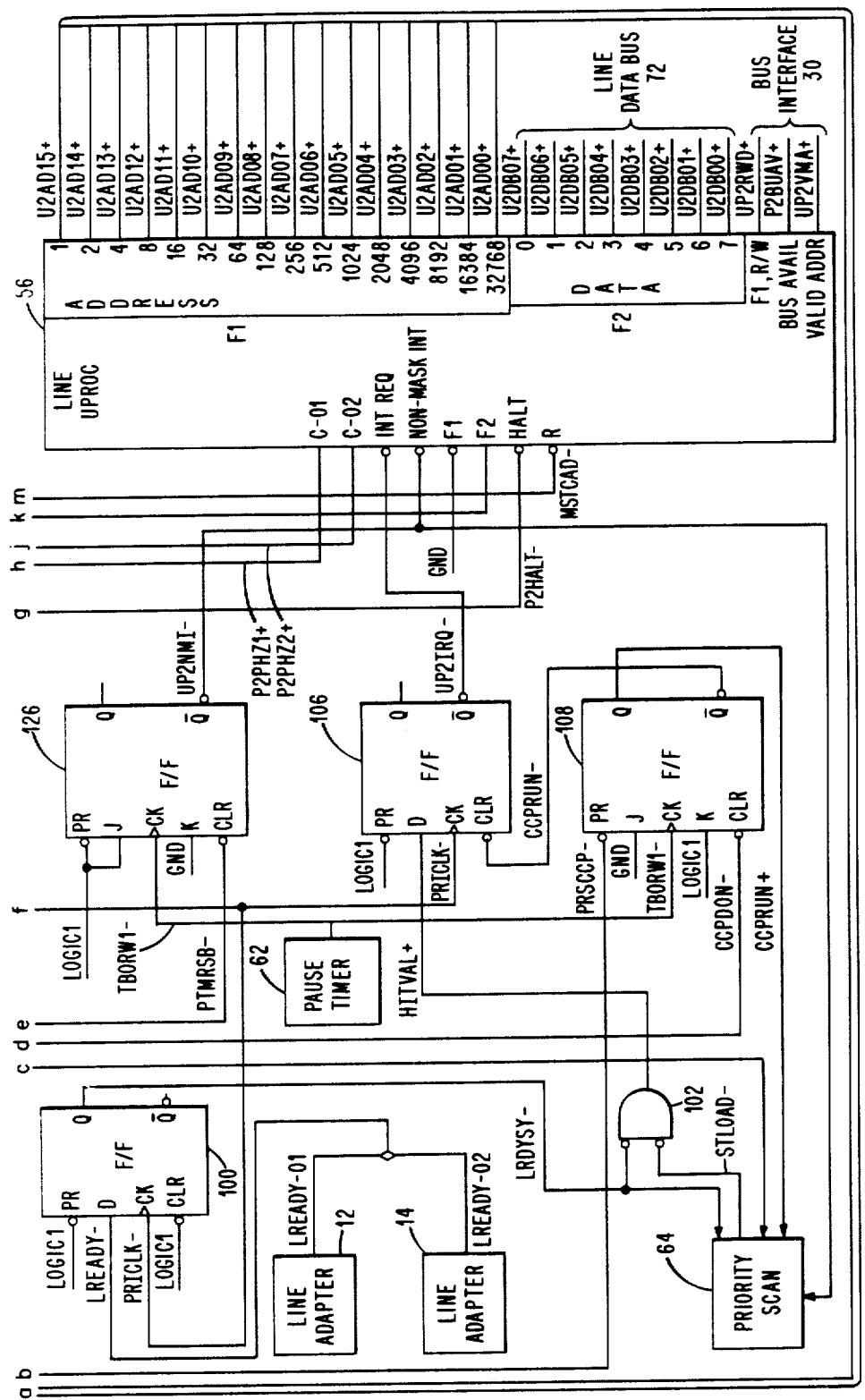
Fig. 3. (sheet 2 of 2)

INTERPROCESSOR COMMUNICATION MAILBOXES
(ADDRESS LOCATIONS IN SHARED MEMORY 44)

MAILBOX 1 BLOCK MODE COMMANDS

```
                      BIT POSITION
         WORD   0   1   2   3   4   5   6   7
            0 | F | R | - | L | L | L | L | D |
            1 | SHARED MEMORY 44, WORK RAM 52, RAM 60 (MSB) |
            2 | SHARED MEMORY 44, WORK RAM 52, RAM 60 (LSB) |
```

F=1  COMMAND PRESENT - SET BY I/O MICROPROCESSOR 36
F=0  COMMAND COMPLETED - SET BY LINE MICROPROCESSOR 56
R=1  MAIN MEMORY 4 BLOCK READ
R=0  MAIN MEMORY 4 BLOCK WRITE
LLLL LINE NUMBER (1 OF 16)
D=0  RECEIVE
D=1  TRANSMIT

MAILBOX 2 I/O MICROPROCESSOR 36 COMMANDS TO LINE MICROPROCESSOR 56

```
                      BIT POSITION
         WORD   0   1   2   3   4   5   6   7
            0 |        ACTION CODE            |
            1 | F | - | - | L | L | L | L | D |
            2 |        REASON CODE            |
```

F=1  COMMAND PRESENT - SET BY I/O MICROPROCESSOR 36
F=0  COMMAND COMPLETED - SET BY LINE MICROPROCESSOR 56
ACTION CODE - $00_{16}$ STOP IO
              $02_{16}$ CHANNEL INITIALIZE
              $04_{16}$ START I/O FROM CPU 2
              $06_{16}$ START I/O FROM ALL OTHERS
REASON CODE - BIT 0 CHANNEL REQUEST INTERRUPT
                  1 DATA SET SCAN
                  2 TIMER
                  7 TRANSMIT/RECEIVE (LOGICAL ONE - TRANSMIT CHANNEL/LOGICAL ZERO - RECEIVE CHANNEL)

MAILBOX 3 LINE MICROPROCESSOR 56 COMMANDS TO I/O MICROPROCESSOR 36

| WORD | BIT POSITION | | | | | | | |
|---|---|---|---|---|---|---|---|---|
| | 0 | 1 | 2 | 3 | 4 | 5 | 6 | 7 |
| 0 | COMMANDS | | | | | | | |
| 1 | F | – | – | L | L | L | L | D |
| 2 | DATA | | | | | | | |
| 3 | COMMANDS | | | | | | | |

F=1 COMMAND PRESENT - SET BY LINE MICROPROCESSOR 56
F=0 COMMAND COMPLETED BY I/O MICROPROCESSOR 36

COMMANDS - WORD 0
    BIT 0 LOAD
    BIT 1 STORE
    BIT 2 GET NEXT BLOCK
    BIT 3 INTERRUPT CPU 2
    BIT 4 BACK SPACE ONE CHARACTER
    BIT 5 TIMER 32
    BIT 6 INITIALIZE
    BIT 7 BACK A LINE

WORD 3
    BIT 0 SPECIAL TIMER

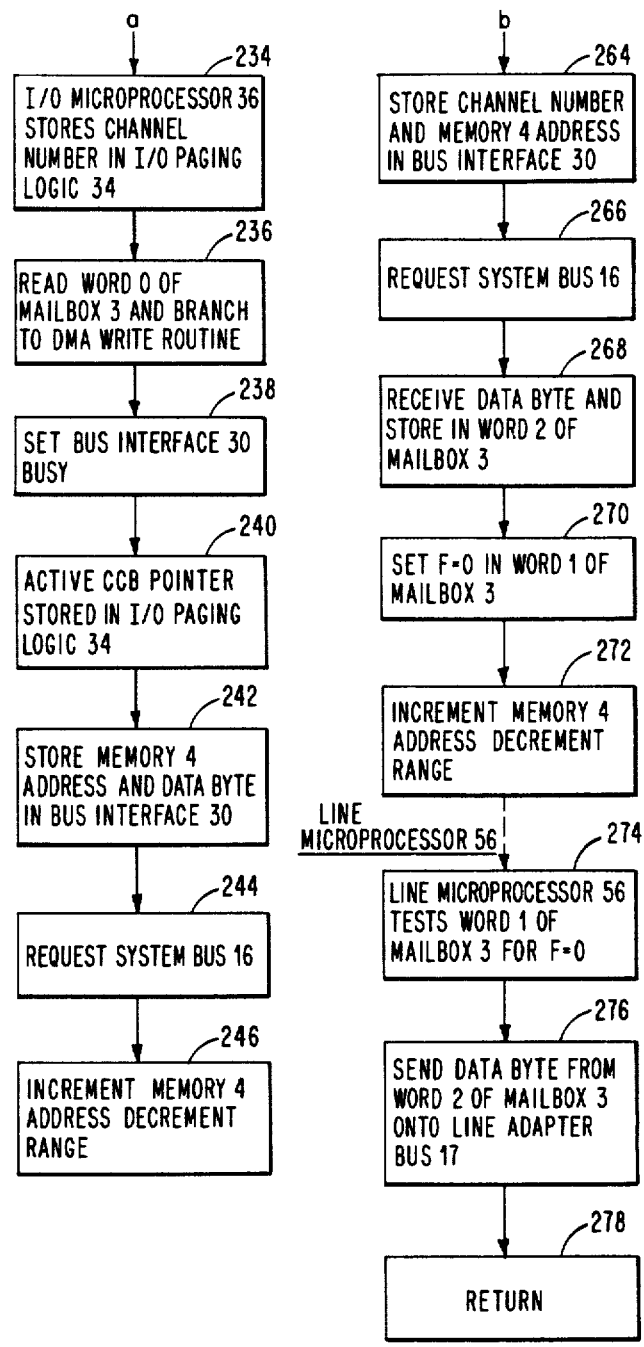
Fig. 6. (sheet 2 of 2)

COMMUNICATION MULTIPLEXER HAVING DUAL MICROPROCESSORS

This application is a continuation of application Ser. No. 192,126, filed 9/29/80 now abandoned.

RELATED APPLICATIONS

The following U.S. patent applications filed on an even date with the instant application and assigned to the same assignee as the instant application are related to the instant application.

1. "A Communication Multiplexer Sharing A Free Running Timer Among Multiple Communication Lines" by Kin C. Yu and Gary J. Goss, filed on Sept. 29, 1980 and having U.S. Ser. No. 191,626 which was abandoned and continued as Ser. No. 514,542, filed on July 18, 1983.

2. "A Communication Multiplexer Having A Variable Priority Scheme Using A Read Only Memory" by Gary J. Goss and Angelo David Kachemov, filed on Sept. 29, 1980 and having U.S. Pat. No. 4,385,382.

3. "A Communication Multiplexer Variable Priority Scheme" by Allen C. Hirtle and Gary J. Goss, filed on Sept. 29, 1980 and having U.S. Pat. No. 4,380,065.

4. "A Communication Multiplexer Having An Apparatus For Establishing A Single Line Priority" by Kin C. Yu and Angelo David Kachemov, issued on Sept. 20, 1983 U.S. Pat. No. 4,405,981.

5. "A Communication Multiplexer Using A Random Access Memory For Storing An Acknowledge Response To An Input/Output Command From A Central Processor" by Kin C. Yu and Gary J. Goss, issued on Jan. 17, 1984 and having U.S. Pat. No. 4,426,679.

BACKGROUND OF THE INVENTION

1. Field of the Invention

This invention relates generally to a data processing system in a communications environment and more specifically to the use of two microprocessors, one for communicating with the devices and the other for communicating with the central processor unit and main memory.

2. Description of the Prior Art

Data processing systems are coupled to a multiplicity of communication lines by a communication controller or as it is commonly called a communication multiplexer. Each of the communication lines may be coupled to a device, typically a cathode ray tube display (CRT). The communication controller is operative to transfer data between a main memory of the data processing system and the devices via the communication line.

Prior art communication multiplexers such as described in U.S. Pat. No. 3,500,466 entitled "Communication Multiplexing Apparatus" includes a first processor for effecting the assembling of data bits from a plurality of communication lines and a second processor for effecting the transfer of data characters between the first and the data processor subsequent to the receipt of one or more special control characters. This had the problem of limiting the throughput and requiring extensive hardware, since the single bit processor was required to assemble the bits into bytes by comparing the bits received from each line with a special stored character.

The hardware required is reduced by the use of a microprocessor controlling communication lines through the use of channel control blocks stored in a memory. Such a system is described in U.S. Pat. No. 4,133,030 entitled "Control System Providing for the Transfer of Data in a Communications Processing System Employing Channel Dedicated Control Blocks". This system, however, limited the throughput by restricting the number of communication lines that could be processed.

It should be understood that the references cited herein are those which the Applicants are aware of and are presented to acquaint the reader with the level of skill in the art and may not be the closest reference to the invention. No representation is made that any search has been conducted by the Applicants.

OBJECTS OF THE INVENTION

Accordingly, it is a primary object of the invention to provide an improved communication subsystem for use in a data processing system.

It is another object of the invention to provide an improved programmable communications system.

It is still another object of the invention to provide a communication subsystem having a first microprocessor operative with the communication lines and a second microprocessor operative with a central processing unit and a main memory of the data processing system.

It is yet another object of the invention to provide apparatus whereby the first microprocessor is responsive to signals from the second microprocessor.

SUMMARY OF THE INVENTION

A data processing system includes a central processing unit, a main memory and a communication subsystem coupled in common to a system bus. The communication subsystem includes a communication controller and a number of line adapters for coupling a number of devices via communication lines to the communication controller.

The communication controller includes a line side and an I/O side. The line side is coupled to a shared memory by a line address bus and a line data bus. The I/O side is coupled to the shared memory by an I/O address bus and an I/O data bus. The line side controls the transfer of data between the line adapters and shared memory and the I/O side controls the transfer of data between the shared memory and main memory or the central processing unit.

In a typical operation, an area in shared memory called a mailbox may be loaded by the line side with a data byte from one of the devices and the channel number of the device. The I/O side will transfer the data byte stored in the mailbox and a main memory address stored in a channel control block in shared memory to main memory via the system bus. If the device requires a data byte, the line side loads the mailbox with the channel number. The I/O side transfers a main memory request to main memory via the system bus, receives the data byte from main memory and stores the data byte in the mailbox. The line side transfers the data byte from the mailbox to the requesting device.

A line microprocessor controls the operation of the line side and an I/O microprocessor controls the operation of the I/O side. Signals from the line adapters, in response to a poll, cause the line microprocessor to interrupt its operation to service the requesting device, store the information in the mailbox and set a flag bit in the mailbox. The line microprocessor then generates signals to interrupt the I/O microprocessor. The I/O microprocessor transfers the information to main memory, loads a response into the mailbox, and resets the flag bit. The line microprocessor tests the flag bit and processes the information in the mailbox when the flag bit is reset indicating that the I/O microprocessor has completed the I/O side operation.

The novel features which are believed to be characteristic of the invention both as to its organization and method of operation, together with further objects and advantages, will be better understood from the following description when considered in connection with the accompanying drawings. It is expressly understood, however, that each of the drawings is given for the purpose of illustration and description only and is not intended as a definition of the limits of the present invention.

BRIEF DESCRIPTION OF THE DRAWINGS

FIG. 2 is an overall block diagram of the communication controller 10.

FIG. 3 is a logic diagram of the I/O microprocessor 36 and line microprocessor 56 interrupt logic.

FIG. 5 shows the layout of the mailboxes in shared memory 44.

DESCRIPTION OF THE PREFERRED EMBODIMENT

Figure 1:
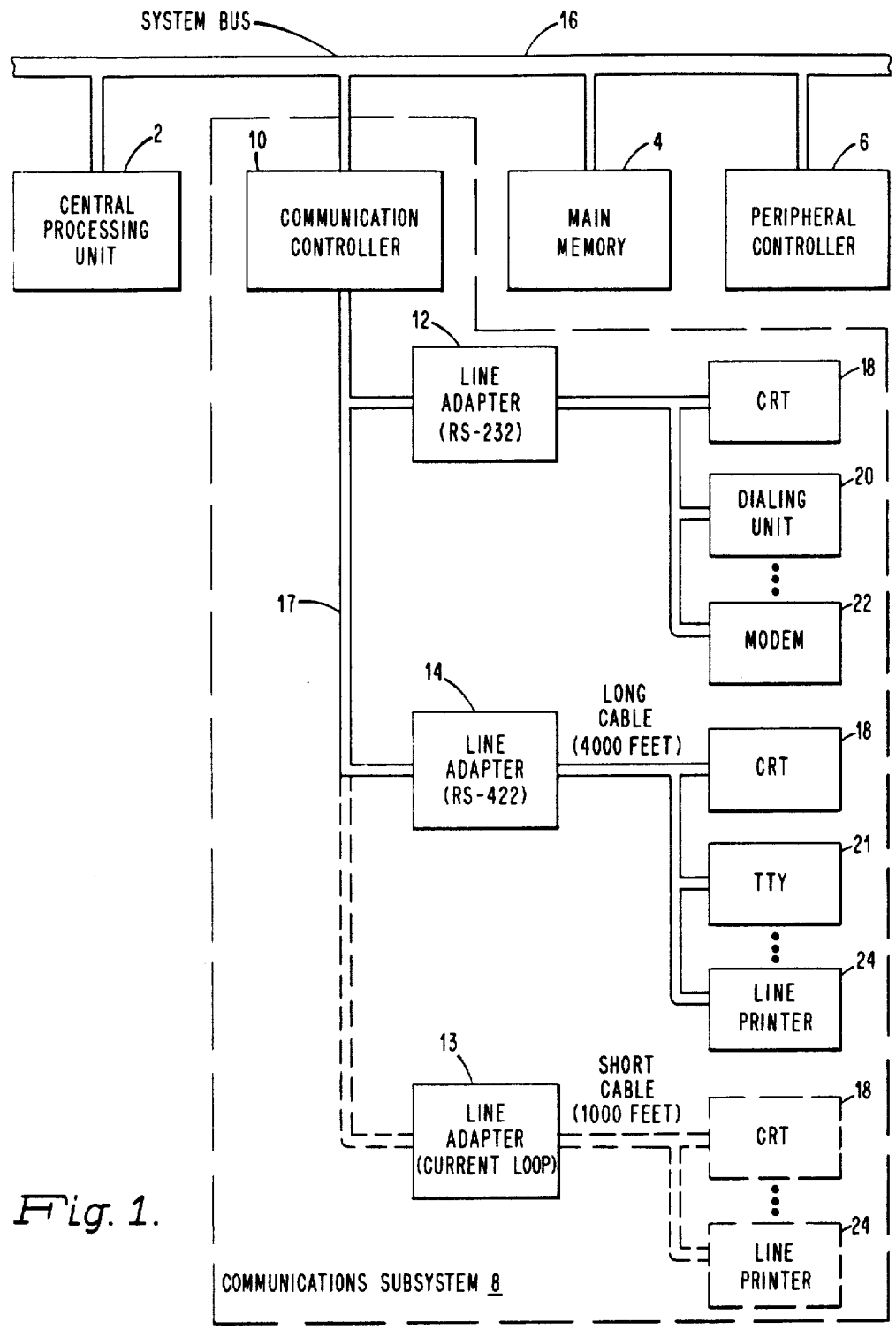
FIG. 1 is an overall block diagram of the data processing system.

FIG. 1 shows a block diagram of the overall data processing system including a central processing unit (CPU) 2, a main memory 4, a communication subsystem 8 and typically a peripheral controller 6, all coupled in common to a system bus 16.

The communication subsystem 8 may be operative with a maximum of 16 communication lines and includes a communication controller 10 coupled to system bus 16, and a plurality of line adapters with their associated devices coupled to the communication controller 10 by a line adapter bus 17.

Typically, communication subsystem 8 may include a line adapter 12 having RS232 interfaces, a line adapter 14 having RS422 interfaces or a line adapter 13 having current loop interfaces. Line adapter 14 has the capability of driving up to 4000 feet of cable and line adapter 13 has the capability of driving up to 1000 feet of cable.

The RS232 interface is described in "EIA RS-232C" dated 1979 and published by the Electronics Industries Associaton, 2001 I Street, N.W., Washington, DC.

The RS422 interface is described in "EIA RS-422" dated 1975 and also published by the above Electronics Industries Association.

The current loop interface is described in the "Bell System Communication—Technical Reference—45, 55 and 75 Baud Printer Line Channels—Interface Specification" which is dated December, 1967 and published by AT&T.

Typical devices operative with the communication controller 10 include a cathode ray tube display (CRT) 18, a dialing unit (801C) 20, a MODEM (202C) 22, a teletype unit (TTY33) 21, and a line printer 24.

Line adapters 13 and 14 may each service up to eight asynchronous lines; line adapter 12 may service up to eight asynchronous lines or up to six asynchronous lines and one synchronous line. However, only two line adapters servicing a maximum of 16 lines may be operative with the communication controller 10.

FIG. 2 shows a block diagram of communication controller 10 which includes an I/O microprocessor 36 which controls the operation of the communication controller 10 with CPU 2 and main memory 4 over system bus 16, and line microprocessor 56 which controls the operation of the communication controller 10 with the line adapters 12 and 14 over line adapter bus 17.

The I/O microprocessor 36 and the line microprocessor 56 communicate with each other through a shared random access memory (RAM) 44 which stores the line control tables (LCT) and communication control blocks (CCB) and a number of mailboxes. Each of the devices is assigned an LCT. Half of the LCT controls the device in a receive mode and the other half of the LCT controls the device in a transmit mode. Similarly, each of the devices is assigned a CCB for each receive block transfer with main memory 4, and a CCB for each transmit block transfer with main memory 4. The LCT and CCB operations are described in the aforementioned U.S. Pat. No. 4,133,030 which is hereby incorporated by reference.

Line control tables identify the number of bits in the device data character, whether the character is odd or even parity, the cycle redundancy check (CRC) formula used and the CRC bytes being developed, the status of the device and pointers to enable the LCT to be operative with a channel control program (CCP).

The CCB stores the main memory 4 address location for the next character either transmitted or received, and the number of characters remaining for processing in the current block. The CCB also stores a control word indicating the last block for transmission, if the CCB was executed, and whether to generate an interrupt upon completion of a block, and a number of status bits indicating the line status at the time the CCB completed. Up to four receive CCB's and up to four transmit CCB's may be stored per device.

A programmable read only memory (PROM) 38 stores the programs that operate with the I/O microprocessor 36. The I/O microprocessor generates signals indicative of an address location in PROM 38 and sends the signals via an I/O paging logic 34 and an I/O address bus 18 to PROM 38. An instruction at that address location is transferred from PROM 38 to the I/O microprocessor 36 via an I/O data bus 74. The I/O microprocessor 36 executes that instruction and generates the address signals indicating the next address location of PROM 38 to read the next instruction over I/O data bus 74.

A work RAM 40 operates with the I/O microprocessor 36 as a scratchpad memory for storing variable data, for stack operation, i.e., storing the return address of an interrupted microprogram, and for providing working storage for data manipulation.

The I/O paging logic 34 receives a virtual address from I/O microprocessor 36 when the I/O microprocessor addresses the LCT or CCB area of shared memory 44 and generates a real address for identifying a location with the LCT or CCB area of a particular channel associated with a selected device. The paging operation is described in U.S. Pat. No. 4,290,104 issued Sept. 15, 1981 entitled "Paging Mechanism".

A bus interface 30 couples the communication controller 10 to the system bus 16 for operation with main memory 4 and CPU 2. The bus request, bus acknowledge, and bus priority operations are described in U.S. Pat. No. 3,993,981 entitled "Apparatus for Processing Data Transfer Requests in a Data Processing System" which is hereby incorporated by reference. Bus interface 30 also provides storage for data and I/O commands that are transferred over system bus 16.

A RAM 60 stores the channel control program (CCP) which processes the data stream of a communication channel. A CCP pointer in the LCT points to the next CCP location in RAM 60 to be referenced by the channel when a channel request interrupt is serviced. The CCP typically controls the transfer of characters between a line adapter interface 66 and shared RAM 44 through line microprocessor 56, performs the check redundant character computation and performs minor editing.

A PROM 58 stores the programs that operate with the line microprocessor 56. The line microprocessor 56 generates address signals indicating an address location in PROM 58 and sends the address signals via a line paging logic 54 and a line address bus 70 to PROM 58. An instruction at that address location is transferred from PROM 58 to line microprocessor 56 via a line data bus 72. The line microprocessor 56 executes that instruction and generates the address signals indicating the next address location of PROM 58 to read the next instruction over line data bus 72.

A work RAM 52 operates as a scratchpad memory for line microprocessor 56 as does work RAM 40 for I/O microprocessor 36.

Line paging logic 54 receives a virtual address which is converted into a real address when addressing the LCT or CCB areas in shared RAM 44. As with I/O paging logic 34, line paging logic 54 allows a single program to address the LCT or CCB associated with any communication channel (2 channels per line: a receive channel and a transmit channel).

An S register 50 is a one byte index register which is operative with PROM 58.

A pause timer 62 detects if a CCP is running too long by counting the number of accesses to RAM 60. If the number of accesses exceeds a predetermined number, typically 100, the line microprocessor 56 is interrupted, the CCP is temporarily deactivated, and a CCP return address is stored in a queue in work RAM 52.

A priority scan 64 accepts data requests associated with each channel of the device adapters and establishes the priorities for servicing the channels in a dynamically variable sequence. This is described in copending related U.S. Pat. No. 4,385,382 entitled "A Communication Multiplexer Having a Variable Priority Scheme Using A Read Only Memory" and U.S. Pat. No. 4,380,065 entitled "A Communication Multiplexer Variable Priority Scheme".

The line adapter interface 66 couples the line adapters 12 and 14 to the communication controller 10 through line adapter bus 17.

The I/O microprocessor 36 implements a number of functions including the handling of I/O instructions from the CPU 2 to the communication controller 10 and the controlling of the transfer of data between line microprocessor 56 and main memory 4. Line microprocessor 56 in conjunction with PROM 38 acts as an interpreter of the CCP. When a CCP instruction which requests a byte to be transferred to/from main memory 4 is decoded by line microprocesor 56, it stores the number of the channel currently being serviced and the data byte of the transfer in the mailbox in shared memory 44. The line microprocessor 56 generates an interrupt through an interrupt logic 78 to the I/O microprocessor 36. The I/O microprocessor 36 in conjunction with PROM 38 will address the mailbox in shared RAM 44 for the channel number and command code as well as the data byte, if this is a receive operation, and address the current CCB of this channel via I/O paging logic 34 for the current main memory address. The I/O microprocessor 36 will transfer the memory address and the data byte to bus interface 30 where the main memory 4 address and the data byte are stored awaiting an acknowledge in response to a bus request for transfer to main memory 4.

Interrupt logic 78 is also responsive to signals from bus interface 30 to interrupt the I/O microprocessor to accept system bus 16 information addressed to communication controller 10.

Interrupt logic 78 is also responsive to a signal from pause timer 62 to interrupt line microprocessor 56 when the number of CCP instructions exceeded the predetermined number; responsive to a signal from priority scan 64 to interrupt line microprocessor 56 to start a polling of the devices; and responsive to a signal from line adapter 66 to interrupt the line microprocessor 56 when a device responds to the poll.

The I/O microprocessor 36, in conjunction with a free running timer 32, may indicate to the line microprocessor 56 to start a predetermined operation after a time delay determined by the line microprocessor 56. The free running timer 32 is described in related copending U.S. application Ser. No. 191,626 which was abandoned and continued as Ser. No. 514,542 entitled "A Communication Multiplexer Sharing A Free Running Timer Among Multiple Communication Lines".

A clock system 76 generates the phase 1 and phase 2 clock signals for I/O microprocessor 36 and line microprocessor 56 as well as a number of timing signals which are described infra.

The I/O microprocessor 36 when receiving an I/O command from CPU 2 may generate an I/O instruction to line microprocessor 56 through a mailbox in shared memory 44 in order to control the CCP stored in RAM 60. This is described in copending related U.S. Pat. No. 4,426,679 entitled "A Communication Multiplexer Using A Random Access Memory For Storing An Acknowledge Response To An Input/Output Command From A Central Processor".

A transceiver (XCVR) 46 and a XCVR 48 isolate the I/O data bus 74 from the line data bus 72. Similarly, a MUX and control 42 isolates the I/O address bus 68 from the line address bus 70 and couples shared RAM 44 to either I/O address bus 68 or line address bus 70.

Referring to FIG. 3, signal LREADY-01 or LREADY-02 at logical ZERO indicates that a device on a communication line coupled to line adapter 12 or 14 requests service by responding to the poll by priority scan 64. Forcing signal LREADY- to logical ZERO resets a flop 100 on the rise of a clock signal PRICLK—. Output signal LRDYSY— at logical ZERO is applied to an input of a NAND gate 102. Signal STLOAD—, the output of priority scan 64, is at logical ZERO during the polling operation as described in copending related U.S. Pat. No. 4,385,382 entitled "A Communication Multiplexer Having A Variable Priority Scheme Using A Read Only Memory".

A flop 106 sets on the next rise of clock signal PRICLK— since the D input signal HITVAL+, the output of a NAND gate 102, is at logical ONE. This forces the output signal UP2IRQ— to logical ZERO, thereby forcing line microprocessor 56 into an interrupt sequence. Line microprocessor 56 generates addresses FFF8$_{16}$ and FFF9$_{16}$ on address lines U2AD00+00 through U2AD15+00 through line paging logic 54 onto line address bus 70 and begins to process instructions stored in PROM 58 and CCP's stored in RAM 60. Signal PRSCCP— is forced to logical ZERO by logic responsive to address signals FFF8$_{16}$ and FFF9$_{16}$ in line paging logic 54. This sets a flop 108. Signal CCPRUN— at logical ZERO resets flop 106 and signals the priority scan 64 that the CCP is active. Interrupt signal UP2IRQ— is forced to logical ONE.

The CCP's control the operation of the communication lines. Each instruction of the CCP calls for a program routine in PROM 62. Line microprocessor 56 performs the instructions of the program routine to perform the CCP instruction.

When the line microprocessor 56 has completed its operation with the communication line, it generates an address 00F1$_{16}$. Line paging logic 54 is responsive to address 00F1$_{16}$ and generates signal LNMREF— at logical ZERO. A decoder 164 is activated and signal LRQIRQ— is forced to logical ZERO. This sets a flop 166 and output signal UP1IRQ— at logical ZERO forces I/O microprocessor 36 into an interrupt mode.

I/O microprocessor 36 generates addresses FFF8$_{16}$ and FFF9$_{16}$. Signal U1CRIQ— from I/O paging logic 34 is responsive to address FFF8$_{16}$ and resets flop 166. The I/O microprocessor 36 is controlled by the program routine stored in PROM 38 to process data in accordance with command signals stored in the mailbox in shared memory 44 by line microprocessor 56.

The CPU 2 may control the communication controller 10 by sending I/O commands over system bus 16. These I/O commands set up the LCT's and CCB's or read the LCT's and CCB's. As an example, one input/output command will set the main memory 4 address in a CCB. Another input/output command will set the range in that CCB. The input/output command operation is described in copending related U.S. Pat. No. 4,426,679 entitled "A Communication Multiplexer Using A Random Access Memory For Storing An Acknowledge Response To An Input/Output Command From A Central Processor".

Bus interface 30 generates signal IOCMMD+ when an input/output command is received from CPU 2 over system bus 16. Output signal IOCMMD+ sets a flop 128 on the rise of timing signal MYD100+ from bus interface 30. Interrupt signal UP1NMI— at logical ZERO is applied to the non-maskable interrupt input terminal of I/O microprocessor 36 which generates interrupt vector addresses FFFC$_{16}$ and FFFD$_{16}$. The input/output command includes a function code which modifies interrupt vector address FFFC$_{16}$ in the I/O paging logic 34 to point to an address location in PROM 38 which stores the starting address of the program which executes the input/output command specified by the function code. Interrupt vector address FFFC$_{16}$ generates signal NM1CLR— in I/O paging logic 34 to reset flop 128.

A flop 126 sets on the rise of the TBORW1— signal from pause timer 62 when the pause timer 62 times out. Interrupt signal UP2NMI— at logical ZERO is applied to the non-maskable interrupt terminal of line microprocessor 56 which generates interrupt vector addresses FFFC$_{16}$ and FFFD$_{16}$. The contents of address locations FFFC$_{16}$ and FFFD$_{16}$ in PROM 58 generate a program address for processing the pause timer 62 time out. Flop 126 is reset during a stop timer or a WAIT instruction when signal PTMRSB—, the output of decoder 164, is forced to logical ZERO.

A number of timing and control signals are applied to the input terminals of I/O microprocessor 36 and line microprocessor 56. Signals P1PHZ1+, P1PHZ2+, P2PHZ1+ and P2PHZ2+ applied to the ∅1 and ∅2 terminals provide the basic timing. Signal CKPHZA— applied to the F2 terminal enables the data bus during a microprocessor write cycle and disables the data bus during a microprocessor read cycle. The signals P1HALT— and P2HALT— at logical ZERO applied to the HALT terminal will halt the microprocessor after the instruction is executed. Signal MSTCAD— applied to the R terminal starts the microprocessor when power is turned on.

Figure 4:
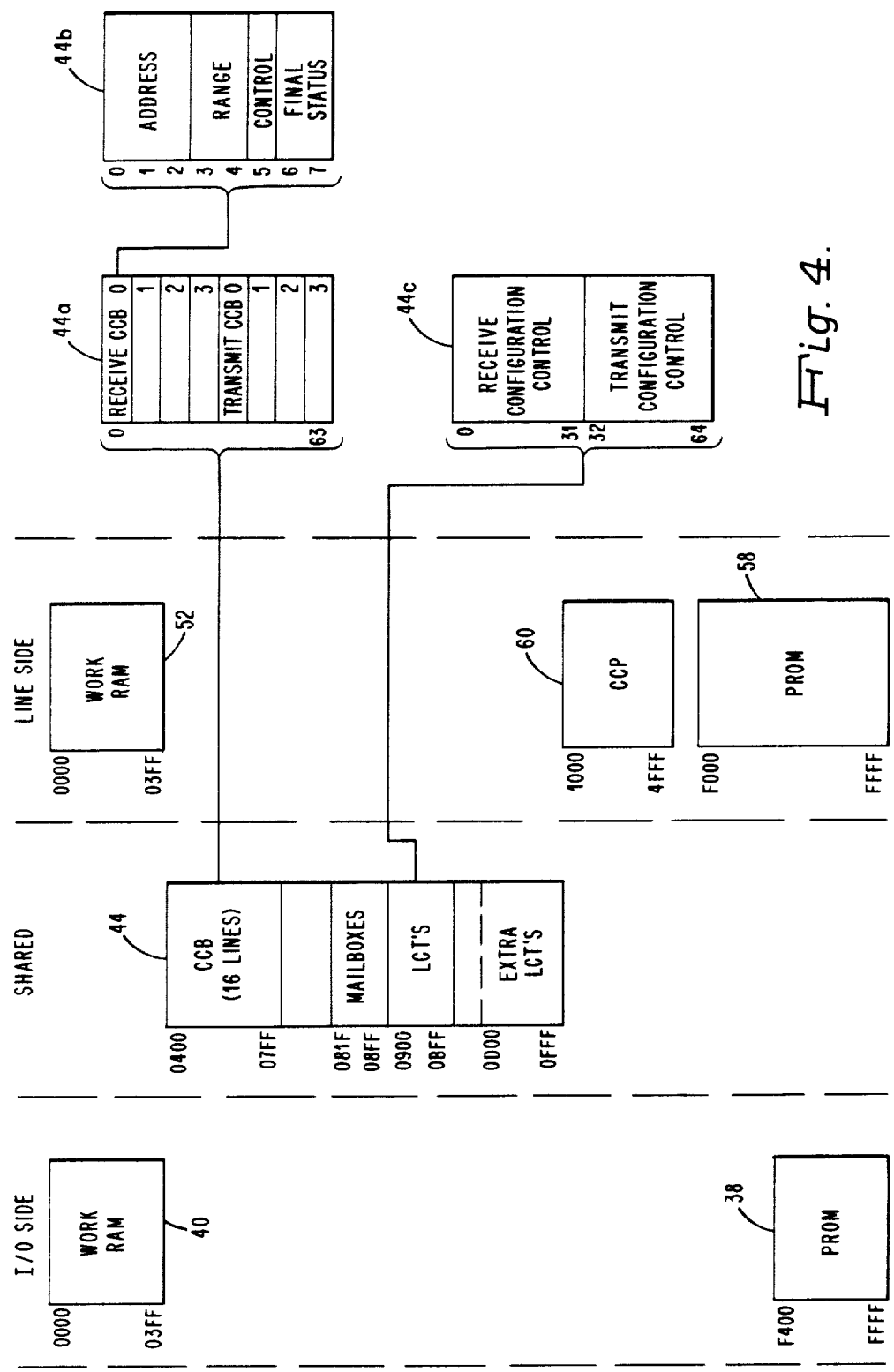
FIG. 4 identifies the address locations of the read only memories and the random access memories in communication controller 10.

FIG. 4 identifies the address locations of the various memories that are operative with either the I/O microprocessor 36 (I/O side), the line microprocessor 56 (line side), or both the I/O microprocessor 36 and the line microprocessor 56 (shared). Work RAM's 40 and 52 are responsive to address signals 0000$_{16}$ through 03FF$_{16}$ received from I/O address bus 68 and line address bus 70, respectively.

Shared memory 44 is responsive to address signals 0400$_{16}$ through 0FFF$_{16}$ received from I/O address bus 68 or line address bus 70. Shared memory 44 has 3,072 address locations: 1,024 address locations for storing CCB's for 16 communication lines, 1,024 address locations for storing LCT's for 16 communication lines, 10 address locations for storing mailboxes and the remaining address locations for storing extra LCT's. Each communication line is operative with CCB's 44a in 64 address locations: 32 address locations for the communication line as a receive channel and 32 address locations for the communication line as a transmit channel. Each receive channel CCB and each transmit channel CCB includes 8 bytes storing 3 bytes of main memory 4 address location, 2 bytes of range, 1 byte of control and 2 bytes of status. Each LCT 44c includes 32 address locations of receive channel configuration and control information and 32 address locations of transmit channel configuration and control information.

RAM 60 includes 16,384 locations, with addresses 1000$_{16}$ through 4FFF$_{16}$ for storing CCP instructions which are under the control of line microprocessor 56.

PROM 38 has 3,072 locations, with addresses F400$_{16}$ through FFF$_{16}$ for storing program instructions that operate with I/O microprocessor 36. PROM 58 has 4,096 locations, with addresses F000$_{16}$ through FFFF$_{16}$ for storing program instructions that operate with line microprocessor 56.

Each channel has associated with it four 8 byte CCB's 44b, each including 3 bytes of main memory 4 address of the next data byte to be processed by that channel, 2 bytes of range, the number of data bytes remaining in the field, 1 control byte and 2 status bytes.

The CCB control byte includes an "interrupt on status complete" bit, a "valid CCB" bit and a "last block" bit.

The CCB final status bytes include bits indicating:

| Bit position | (0 = most significant bit) |
|---|---|
| 0 | The CCP executes a CPU 2 interrupt instruction. |
| 1 | An interrupt was generated for this CCB. |
| 2 | Data Service Error. |
| 3 | CCB was executed and status is complete. |
| 4 | CCB Service Error since CCB not available. |
| 5,6 | Flag between CCP and CPU 2. |
| 9 | Data Clock Error. |
| 10 | Range not equal to zero when in receive mode. Last block bit of CCB control word set in transmit mode. |
| 11 | Data set status changed. |
| 12 | Memory 4 error corrected. |
| 13 | Invalid memory 4 address. |
| 14 | System bus 16 parity error. |
| 15 | Uncorrected memory 4 error. |

The I/O microprocessor 36 and line microprocessor 56 communicate with each other by means of mailboxes stored in locations in shared RAM 44. The contents of these mailbox locations are shown in FIG. 5.

The communication controller 10 uses three mailboxes: (a) block mode commands, (b) I/O microprocessor 36 commands to line microprocessor 56, and (c) line microprocessor 56 commands to I/O microprocessor 36.

The CPU 2 may initiate a block read operation or a block write operation by means of I/O commands. As a result of the input/output command when the mailbox is available (F=logical ZERO), the block mode command mailbox is set up with an address in the line microprocessor address space. This is the address of the first location to receive a byte from shared memory 44 if the D bit, bit 7 of word 0, is at logical ZERO, or from which to transmit a byte to shared memory 44 if the D bit is at logical ONE.

Bit positions 3 through 6 of word 0 specify the channel number of the communication line requiring the block transfer. The CCB stored in shared memory 44 associated with that channel specifies the starting main memory 4 address and the range, the number of bytes in the block, involved in the block transfer.

The R bit, bit 1 of word 0, when at logical ONE specifies a main memory 4 block read operation, and when at logical ZERO a main memory 4 block write operation.

The F bit, bit 0 of word 0, is set to logical ONE by I/O microprocessor 36 to specify that a command is present, and is reset to logical ZERO by the line microprocessor 56 when the command is completed.

The line microprocessor 56 scans word 0 of block mode command mailbox. If bit 0 of word 0 is at logical ONE, then the line microprocessor 56 initiates a firmware routine which identifies the channel number and determines if this is a read or write operation. If this is a read operation, then the STORE subroutine is processed. If this is a write operation, then the LOAD subroutine is processed. When the range as stored in the CCB for this channel number reaches ZERO, the line microprocessor 56 resets the F bit, bit 0 of word 0, and terminates this block mode operation.

The I/O microprocessor 36 commands to line microprocessor 56 mailbox 2 specifies the action the line microprocessor 56 is to take and the reason for the action. Word 0 specifies the action code. Action code $00_{16}$ specifies a stop I/O command which prevents any further channel activity by halting the CCP program and preventing further data-generated channel request interrupts from the channel specified in word 1.

Action code $02_{16}$ initializes the channel by clearing the CCB's and LCT's associated with the channel number specified in word 1.

Action code $04_{16}$ starts the CCP execution at an address specified by the LCT words 6 and 7 associated with the channel specified in word 1. This LCT address is specified by CPU 2 initially by an I/O command.

Action code $06_{16}$ starts the CCP execution as the result of an interrupt from a communication channel. The CCB for that channel specifies the starting CCP address location.

Word 2 of the I/O microprocessor 36 commands to line microprocessor 56 mailbox 2 specifies the reason code. Bit 0 at logical ONE indicates a channel request interrupt.

Bit 1 identifies a data set scan operation. The data scan routine compares the present status with the old status stored in LCT 14. A difference indicates that a particular channel status has changed. The contents of LCT 8 then determine the action the line microprocessor 56 will take.

Bit 2 indicates that the timer 62 which was set by the CCP has timed out.

Bit 7 indicates the direction of the line, receive or transmit.

The line microprocessor 56 reads the F bit of word 1. When bit 0 is at logical ONE, the line microprocessor 56 reads word 0 and branches to a subroutine specified by the action code. Bit 0 of word 1 is reset to logical ONE when the action is completed.

The line microprocessor 56 commands to I/O microprocessor 36 mailbox 3 is active during a request by a line adapter 12 or 14 for service causing the line microprocessor 56 to start the processing of the CCP instruction specified by the commands stored in the mailbox 3.

Bit position 0 of word 0 of mailbox 3 at logical ONE specifies a load DMA read from main memory 4 command at an address specified by the CCB of the channel number stored in word 1 of mailbox 3.

The data bytes read from memory are stored in word 2 of the line microprocessor 56 command to I/O microprocessor 36 mailbox 3. Line microprocessor 56 processes the data bytes in accordance with the CCP as each data byte is stored in the mailbox under control of the I/O microprocessor 36.

Bit position 1 of word 0 at logical ONE specifies a store DMA write into main memory 4 at an address specified by the CCB of the channel number stored in word 1. The data bytes are stored in word 2 of the mailbox 3 under control of line microprocessor 56 and transferred to main memory 4 via system bus 16 under control of I/O microprocessor 36.

Bit position 2 of word 0 at logical ONE specifies a get next block (GNB) command. This indicates to the I/O microprocessor 36 that the block transfer is complete and to clear the CCB control field.

Bit position 3 of word 0 at logical ONE results in the I/O microprocessor 36 interrupting CPU 2 and in conjunction with bit position 2 at logical ONE (GNB) will result in an I/O command from the CPU loading the CCB for another block transfer.

Bit position 4 of the word 0 at logical ONE indicates a backspace one character operation. A CRT 18 operator may want to correct a character.

Bit position 5 of word 0 at logical ONE indicates that the timer 32 is in an "ON" condition.

Bit position 6 of word 0 at logical ONE indicates an initialize operation.

Bit position 7 of word 0 at logical ONE indicates the backing up of a line. The CRT 18 operator may want to correct a line.

Bit position 0 of word 3 indicates a special 200 millisecond pause timer 62 operation.

Figure 6:
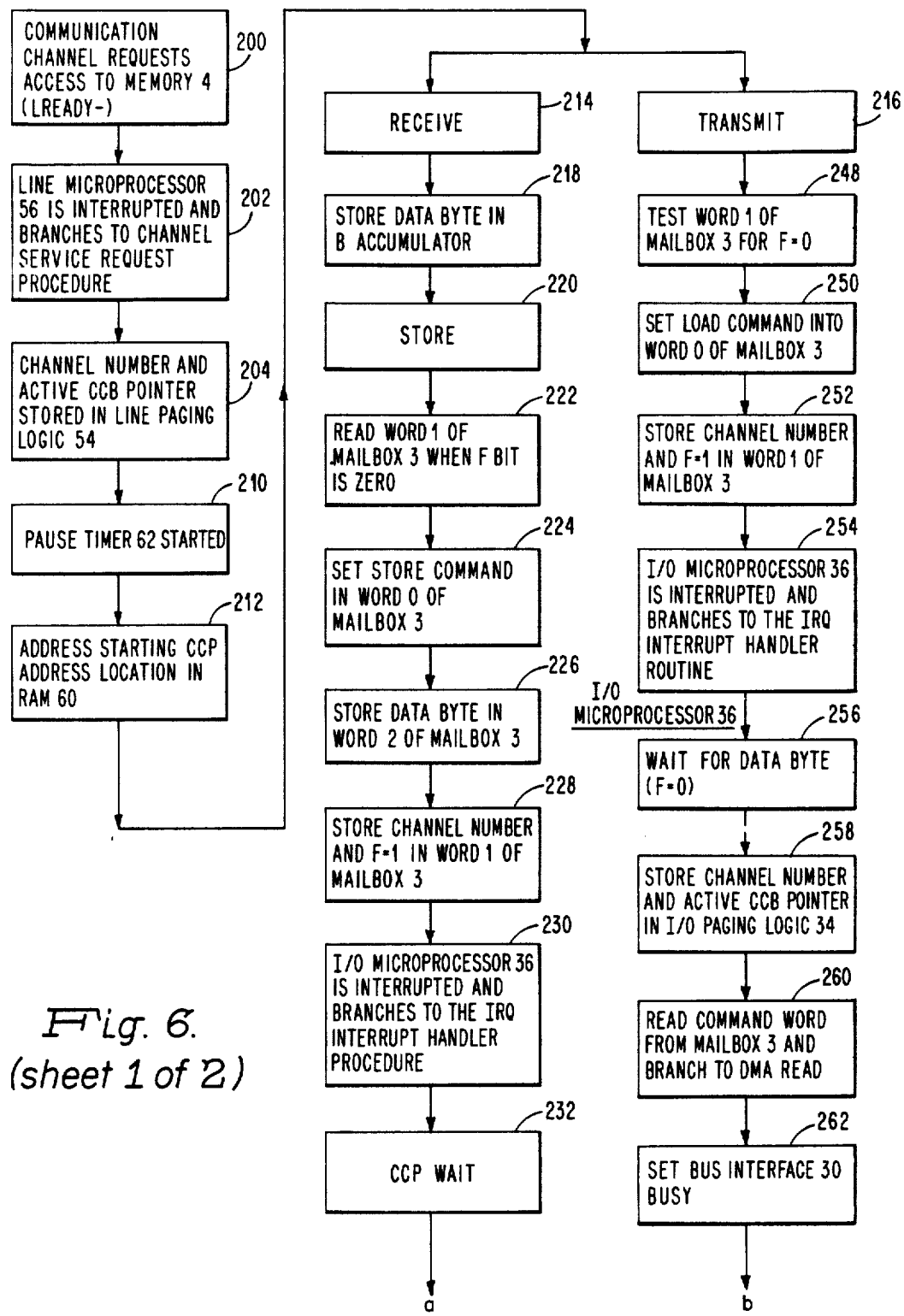
FIG. 6 is a flow diagram showing the I/O microprocessor 36 and line microprocessor 56 in a typical operation.

FIG. 6 is a flow diagram showing the transfer of a data byte from a communications device, typically a CRT 18, via line adapter bus 17, FIG. 2, communication controller 10 to memory 4 via system bus 16; and from main memory 4, via system bus 16, communication controller 10, via line adapter bus 17 to CRT 18.

The line adapter 12 or 14 generates signal LREADY−01 or signal LREADY−02, FIG. 3, which is wire OR'd to generate signal LREADY− of block 200. This sets flop 106 which generates signal UP2IRQ− thereby interrupting line microprocessor 56 in block 202. Line microprocessor 56 generates interrupt vector addresses $FFF8_{16}$ and $FFF9_{16}$. The contents of addresses $FFF8_{16}$ and $FFF9_{16}$ in PROM 58 point to a Channel Request Service Routine stored in PROM 58.

In block 204, the channel number including the D bit, indicating if this is a receive or transmit operation, is stored in a register (not shown) in line paging logic 54 along with the active CCB pointer which selects one of 4 CCB's 44a, FIG. 4. The channel number and active CCB pointer are used by the line paging logic 54 to convert a virtual address from line microprocessor 56 pointing to a particular LCT or CCB for all 64 communication channels stored in shared memory 44 to a real address pointing to that LCT or CCB for the one requesting channel stored in shared memory 44.

A count of $FF_{16}$ stored in pause timer 62 by line microprocessor 56 in block 210 starts monitoring the duration of the CCP. Block 212 addresses the starting CCP location in RAM 60 which is stored in an LCT associated with the requesting communication channel. Here the channel number indicates a receive operation in block 214, that is the communication controller 10 will receive a data byte from CRT 18 and load the data byte in the B accumulator of line microprocessor 56.

A CCP store instruction is called from RAM 60 in block 220 and when the F bit of word 1 of mailbox 3 equals zero, the store command $40_{16}$ is stored in word 0 in block 224, the data byte is stored in word 2 in block 226 and the channel number and the F bit set to ONE is stored in word 1 of mailbox 3 in block 228.

In block 230, line microprocessor 56 generates address $00F1_{16}$ setting flop 166 thereby generating the I/O microprocessor 36 interrupt signal UP1IRQ−, FIG. 3. The I/O microprocessor 36 generates interrupt vector addresses $FFF8_{16}$ and $FFF9_{16}$ in response to the signal UP1IRQ−. The locations specified by the interrupt vector address store the starting address in PROM 38 of the IRQ Interrupt Handler routine. The line microprocessor 56 calls for a CCP WAIT instruction in block 232, which causes the line microprocessor 56 to suspend operation until the next communication channel interrupt signal LREADY−01 or LREADY−02 is generated.

The I/O microprocessor 36 in block 234 stores the channel number read from word 1 of mailbox 3 into I/O paging logic 34. In block 236, the I/O microprocessor 36 reads the command word in mailbox 3, $40_{16}$, indicating a store operation and branches to a DMA WRITE routine in PROM 38.

The bus interface 30 in block 238 is set to give a busy response to any system bus 16 request of communication controller 10. The active CCB pointer is stored in a register (not shown) in I/O paging logic 34 in block 240 and in conjunction with the channel number converts virtual addresses into real addresses.

The I/O microprocessor 36 stores in block 242 the main memory 4 address from CCB 44b, FIG. 4, and the data byte from word 2 of mailbox 3 in registers (not shown) in bus interface 30. I/O microprocessor 36 generates address $00F7_{16}$ in block 244 to request system bus 16 for the transfer of the main memory 4 address and data byte stored in bus interface 30 to main memory 4 for writing the data byte in the specified address location. The main memory 4 address is incremented and the range decremented in block 246 and written into the CCB of the requesting communication channel. The address indicates the main memory 4 address location into which the next data byte from the requesting communication channel is written. The range, which indicates the number of data bytes remaining to be transferred to main memory 4, is tested for "equal to ZERO". This "ZERO" test is not described since it is not pertinent to the invention.

If the CRT 18 was requesting a data byte from main memory as indicated by the channel number (D bit), then block 212 would call for a transmit operation in the form of a CCP LOAD instruction in block 216.

The line microprocessor 56 in block 248 tests the flag bit F for ZERO indicating that the I/O microprocessor 36 has completed a previous operation and sets the load command $80_{16}$ into the command word 0 of mailbox 3 in block 250. The channel number and flag bit F set at ONE are stored in word 1 of mailbox 3 in block 252.

The I/O microprocessor 36 is interrupted and branches to the IRQ Interrupt Handler Routine in block 254 as described supra, meanwhile the line microprocessor 56 waits for the data byte by testing the flag bit F of word 1 of mailbox 3 for ZERO in block 256.

The I/O microprocessor 36 in block 258 stores the active CCB pointer and the channel number in I/O paging logic 34, reads the command word ($80_{16}$) from word 0 of mailbox 3 and branches to a DMA READ routine in PROM 38.

The bus interface 30 is set to give a busy response to a system bus 16 request in bock 262. The I/O microprocessor 36 stores the channel number from word 1 of mailbox 3 and the main memory 4 address from the CCB in bus interface 30 registers (not shown) in block 264 and in block 266 requests system bus 16 by generating address $00F7_{16}$ for the transfer of channel number and address to main memory 4 over system bus 16.

The data byte is received by the I/O microprocessor 36 and stored in word 2 of mailbox 3 in block 268.

The flag bit F is set to ZERO in word 1 of mailbox 3 in block 270 which indicates to the line microprocessor 56 that the data byte is stored in the mailbox 3.

The main memory 4 address is incremented and the range decremented in block 272 for storage in the CCB of the requesting CRT 18.

Line microprocessor 56 tests word 1 for flag bit F equal to ZERO in block 274 and in block 276 sends the data byte from word 2 of mailbox 3 out on line adapter bus 17 to CRT 18. In block 278, the line microprocessor 56 returns to the main program.

The following logic circuits are described in the TTL Data Book for Design Engineers, Second Edition, Copyright 1976, by Texas Instruments Inc.

| Flops 100, 128 | 74S74 |
| 106 | 74LS74 |
| 108, 126, 166 | 74LS112 |
| Decoder 164 | 74LS138 |

Microprocessors 36 and 56 are Motorola 6800B circuits described in The Complete Microcomputer Data Catalog, Copyright 1978, by Motorola Semiconductor Products Inc., Box 20912, Phoenix, Arizona.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system includes a central processing unit, a main memory and a communication controller, all coupled in common to a system bus for transferring data bytes between said main memory and a plurality of input/output devices coupled to said communication controller, said communication controller comprising:

shared memory means including mailbox means for storing each of said data bytes received from one of said plurality of input/output devices for transfer to said main memory and storing a receive channel number when said communication controller is in a receive mode of operation, and for storing each of said data bytes received from said main memory for transfer to said one of said plurality of input/output devices and a transmit channel number when said communication controller is in a transmit mode of operation, said shared memory means further including channel control block means for storing a plurality of main memory addresses, each of said plurality of main memory addresses identifying a main memory location into which said each of said data bytes is stored for transmitting to said one of said plurality of input/output devices and identifying a main memory location into which said each of said data words received from said one of said input/output devices is stored;

line microprocessor means being responsive to said one of said plurality of input/output devices requesting service during a polling operation indicative of said receive mode of operation for transferring said each of said data bytes to said shared memory means and, said line microprocessor means being responsive to said one of said plurality of input/output devices requesting service during said polling operation indicative of said transmit operation for storing said transmit channel number of said one of said plurality of input/output devices, said line microprocessor means including first means for generating a first interrupt signal for indicating that one of said data bytes receives from said one of said input/output devices and said receive channel number or said transmit channel number of said one of said plurality of input/output devices is stored in said channel memory means; and I/O microprocessor means responsive to said first interrupt signal for transferring said each of said data bytes stored in said shared memory for storage in said main memory at an address location specified by one of said main memory addresses stored in said shared memory means and being responsive to said transmit channel number for transferring said each of said data bytes from said address location specified by said one of said main memory addresses to said shared memory means, said I/O microprocessor means including means for setting a flag bit in said mailbox means when said each of said data bytes received from said main memory is stored in said shared memory means;

said line microprocessor means including means for testing said flag bit, said testing means for generating a second interrupt signal when said flag bit is set, said line microprocessor means being responsive to said second interrupt signal for transferring said one of said data bytes from said shared memory means to said one of said plurality of input/output devices;

said shared memory means further storing said data bytes wherein said data bytes are transferred from said shared memory to said main memory and stored in said main memory at a location specified by one of said main memory addresses, and said data bytes are transferred from said main memory location specified by said one of said main memory addresses to said shared memory.

2. The system of claim 1 wherein said shared memory means comprises:

said mailbox means for storing said data bytes and said receive or said transmit channel numbers;

channel control block means for storing a plurality of said main memory addresses identifying locations in said main memory for storing said data bytes received from or being transferred to said one of said plurality of input/output devices, said I/O microprocessor means being responsive to said receive or said transmit channel numbers for selecting one of said main memory addresses for transfer to said main memory.

3. The system of claim 2 wherein said mailbox means stores:

said receive channel number or said transmit channel number being generated by a priority scan means indicative of said communication controller receiving said data bytes from or transmitting said data bytes to said one of said plurality of input/output devices;

a load command generated by microinstructions executed by said line microprocessor means indicative of said one of said plurality of input/output devices requesting one of said data bytes from said main memory;

a store command generated by microinstructions executed by said line microprocessor means indicative of said one of said plurality of input/output devices transferring said one of said data bytes to said main memory; and said flag bit in a first state indicative of said mailbox means being available to said line microprocessor means, and said flag bit in a second state indicative of said mailbox means being available to said I/O microprocessor means.

4. The system of claim 3 wherein said I/O microprocessor means is responsive to signals from said mailbox means representative of said receive channel number for reading out a first of said main memory addresses from said channel control block means for addressing said main memory locations into which are written a first of said data bytes received from said one of said plurality of input/output devices in said main memory, and responsive to signals representative of said transmit channel number for reading out a second of said main memory addresses for reading a second of said data bytes from from said main memory for transfer to said one of said plurality of input/output devices.

5. The system of claim 4 wherein said line microprocessor means comprises:

a first read only memory for storing a first plurality of microprograms;

a line microprocessor for executing microword instructions of said first plurality of microprograms;

second means being responsive to a ready signal indicative of said one of said plurality of input/output devices requesting service during said polling operation for generating a third interrupt signal;

said line microprocessor being responsive to said third interrupt signal for branching to address locations to said first read only memory for reading out and executing microword instructions of one of said first plurality of microprograms;

said line microprocessor executing said microword instructions and generating a plurality of address signals for storing said store command generated by a first of said microword instructions, said receive channel number generated by said priority scan and said one of said data bytes received from said one of said plurality of input/output devices in said mailbox means, and said line microprocessor executing said microword instructions and generating said plurality of address signals for storing said load command generated by a second of said microword instructions and said transmit channel number generated by said priority scan in said mailbox means when said flag bit is in said first state, and generating said flag bit in said second state;

said first means being responsive to said plurality of selected address signals from said line microprocessor for generating said first interrupt signal.

6. The system of claim 5 wherein said I/O microprocessor means comprises:

a second read only memory for storing a second plurality of microprograms; and an I/O microprocessor for executing microword instructions of said second plurality of microprograms, and responsive to said first interrupt signal for addressing locations of said second read only memory for reading out and executing microword instructions of one of said second plurality of microprograms;

said I/O microprocessor being responsive to said microword instructions when said flag bit is in said second state for generating a plurality of address signals for reading said receive channel number, said store command and said first of said data bytes from said mailbox means during a receive mode of operation, and reading out said transmit channel number and said load command from said mailbox means during a transmit mode of operation;

said I/O microprocessor being further responsive to said microword instructions for generating said plurality of address signals for transferring said receive channel number from said mailbox means to a paging logic means for generating address signals for reading out a first of said plurality of said main memory address locations from said channel control block means;

said I/O microprocessor being responsive to said store command for generating said plurality of address signals for branching to a third plurality of microprograms for storing said one of said data bytes in said main memory at said first of said main memory address locations;

said I/O microprocessor being responsive to said microword instructions for generating said plurality of address signals for transferring said transmit channel number from said mailbox means to said paging logic for generating address signals for reading out a second of said plurality of said main memory address locations from said channel control block means;

said I/O microprocessor being responsive to said load command for generating said plurality of address signals from branching to a fourth plurality of microprograms for transferring a preassigned channel number to said main memory and for transferring said second of said data bytes from said second plurality of said main memory address locations of said main memory to said mailbox means;

said a I/O microprocessor for generating said plurality of address signals for setting said flag bit to said first state.

7. The system of claim 6 wherein said line microprocessor being responsive to said flag bit in said first state for transferring said one of said data bytes from said mailbox means to said one of said plurality of input/output devices.

8. The system of claim 7 wherein said first means is a decoder.

9. The system of claim 8 wherein said second means is a first bistable logic element.

10. The system of claim 9 wherein said third means in a second bistable logic element.

* * * * *